United States Patent [19]

Cohen

[11] 4,081,248

[45] Mar. 28, 1978

[54] INTERNALLY COATED REACTION VESSEL FOR USE IN OLEFINIC POLYMERIZATION

[75] Inventor: Louis Cohen, Avon Lake, Ohio

[73] Assignee: The B. F. Goodrich Company, Akron, Ohio

[21] Appl. No.: 781,828

[22] Filed: Mar. 28, 1977

Related U.S. Application Data

[63] Continuation-in-part of Ser. No. 714,317, Aug. 16, 1976, abandoned.

[51] Int. Cl.$^2$ ................................................ B01J 8/00
[52] U.S. Cl. .................................... 23/285; 23/288 E; 427/230; 427/236; 427/239; 428/35; 526/62
[58] Field of Search ................... 428/35; 260/29.6 N, 260/29.6 NR, 874, 47 R; 526/617, 62; 23/252 A, 285, 288 E; 427/230, 236, 239

[56] References Cited

U.S. PATENT DOCUMENTS

| | | | |
|---|---|---|---|
| 3,825,434 | 7/1974 | Berens et al. | 23/285 |
| 3,849,179 | 11/1974 | Morningstar | 23/285 |
| 4,007,320 | 2/1977 | Peterson | 23/285 |
| 4,024,301 | 5/1977 | Witenhafer et al. | 23/285 |
| 4,024,330 | 5/1977 | Morningstar et al. | 427/230 |

Primary Examiner—William R. Dixon, Jr.
Attorney, Agent, or Firm—Roy P. Wymbs

[57] ABSTRACT

This invention relates to a polymerization reactionvessel having an approximate monolayer coating on the inner surface thereof resulting from applying thereto an aqueous alkali metal hydroxide coating solution containing a straight chain or branched polyaromatic amine and a dispersant operable in aqueous media, such as, for example, polyvinyl alcohol. When polymerizing olefinic monomers, such as vinyl halides, vinylidene halides, and vinylidene monomers having at least one terminal $CH_2=C<$ grouping, and mixtures thereof, in the presence of said coating, polymer build-up on the inner surfaces of the reaction vessel is substantially eliminated. Further, multiple charges or batches of polymer can be made in said internally coated reaction vessel without opening the same between charges thus preventing the escape of unreacted monomer to the atmosphere.

49 Claims, No Drawings

INTERNALLY COATED REACTION VESSEL FOR USE IN OLEFINIC POLYMERIZATION

CROSS REFERENCE TO RELATED APPLICATIONS

This application is a continuation-in-part of my copending application Ser. No. 714,317, filed Aug. 16, 1976, now abandoned. Related applications for U.S. patent are:
(1) Ser. No. 507,129, filed Sept. 18, 1974, in the names of Henry J. Kehe and Marion G. Morningstar, now abandoned;
(2) Ser. No. 566,086, filed Apr. 8, 1975, continuation-in-part of (1) and same inventors, now abandoned.
(3) Ser. No. 607,262, filed Aug. 26, 1975, now U.S. Pat. No. 4,024,330, continuation-in-part of (2) and same inventors; and
(4) Ser. No. 574,037, filed May 2, 1975, now U.S. Pat. No. 4,024,301, in the names of Donald E. Witenhafer, James B. Haehn and Louis Cohen.

BACKGROUND OF THE INVENTION

Various type chemical processes are commonly carried out in large, stirred vessels which are frequently provided with auxiliary equipment, such as baffles, heat transfer coils which enable heat to be supplied or extracted from the contents of the vessels, and the like. In many cases, however, such processes eventually produce undesirable deposits on the surfaces of the equipment with which the reaction mixtures come into contact. Such deposits interfere with the efficient transfer of heat to and from the interior of the vessels. Further, these deposits have a tendency to deteriorate and to partially fragment resulting in contamination of the reaction mixture and the products produced therefrom. This problem is particularly prevalent in polymerization type reactions, since the deposits, or "build-up", of solid polymer on reactor surfaces, not only interferes with heat transfer, but decreases productivity and adversely affects polymer quality.

This problem is particularly bad in the commercial production of polymers and copolymers of vinyl and vinylidene halides, when polymerized alone or with other vinylidene monomers having a terminal $CH_2=C<$ group, or with polymerizable monoolefinic monomers. For example, in the commercial production of vinyl chloride polymers, the same are usually produced in the form of discrete particles by polymerization in aqueous suspension systems. When employing such a polymerization system, the vinyl chloride, and other comonomers when used, are maintained in the form of small discrete droplets by the use of suspending agents and agitation. When the reaction is complete, the resultant polymer is washed and dried. These aqueous suspension systems polymerization reactions are usually conducted under pressure in metal reactors equipped with baffles and high speed agitators. However, these suspension systems are inherently unstable and during the polymerization reaction, vinyl chloride polymer builds up on the interior surfaces of the polymerization reactor, including the surfaces of the baffles and agitator. Obviously, this polymer buildup must be removed since it results in further formation of polymer buildup which in turn results in a crust that adversely affects heat transfer and contaminates the polymer being produced.

The nature of the polymer buildup, or insoluble deposit on the walls of the reactor, is such that in the commercial production of polymers, as described above, it has in the past been standard practice, after each polymerization reaction is completed, to have an operator enter the reactor and scrape the polymer buildup off the walls and off the baffles and agitator. An operation such as this is not only costly, both in labor and down-time of the reactor, but presents potential health hazards as well. While various methods have heretofore been proposed to reduce the amount and nature of polymer buildup on polymerization reactor surfaces, such as solvent cleaning, various hydraulic and mechanical reactor cleaners, and the like, none has proved to be the ultimate in polymer buildup removal. That is to say, these various methods and apparatus have done an acceptable job, but there is still room for improvement in this area, particularly, from an economic point of view.

In copending application for U.S. patent, Ser. No. 574,037, filed May 2, 1975, in the names of Donald E. Witenhafer, James B. Haehn and Louis Cohen, there is disclosed and claimed a process for coating the inner surfaces of a polymerization vessel or reactor with an aqueous alkali metal hydroxide coating solution containing a straight chain or branched polyaromatic amine. This claimed process has proved to be more than satisfactory in achieving the intended results and multiple reactions can be run in the polymerization vessel so coated without opening the same between each reaction. However, experience with such process, on a commercial scale, has shown that more dilute coating solutions would be desirable in order to reduce costs and more importantly, to reduce the color of said solutions. Since the polyaromatic amines are colored condensation polymers, there is a tendency, on occasion, for some of the polymer particles being formed during the polymerization reaction in the presence of the coating on the inner surfaces of the polymerizer to become discolored which, of course, is undesirable and to be avoided, if possible. It should be pointed out, however, that the effectiveness of such coating solutions in reducing, and substantially eliminating, polymer buildup is not affected by such discoloration problem. Therefore, it would be desirable to have an improved coating solution which substantially eliminates the potential discoloration problem.

SUMMARY OF THE INVENTION

It has been found that if a polymerization reaction vessel, particularly one having inner surfaces of stainless steel, has been previously coated on said inner surfaces with the proper coating, undesirable polymer buildup on said surfaces can be substantially decreased, and in many cases entirely eliminated, when polymerizing olefinic monomers therein. I have now found that when the interior surfaces of a polymerization reactor are coated with an aqueous alkali metal hydroxide coating solution containing, in certain necessary prescribed concentrations, a straight chain or branched polyaromatic amine condensation product and an aqueous media dispersant, polymer buildup on said interior surfaces of the reaction is essentially eliminated. Due to the nature of the coating solution or composition, it can be applied to the inner surfaces of the reactor without opening the same thus providing a closed polymerization system. By use of the particular combination of components in the coating solution, the necessary critical surface tension ($\gamma_c$) for wetting of a solid surface is obtained which results in greatly reduced concentration of the polyaromatic amine in the coating composition and application thereof to the surfaces in the monolayer, or multilayer when more than one application is made, producing a water-wettable surface resistant to polymer formation thereon. In polymerizing the monomers in such a coated reaction vessel or reactor, the same is done in an aqueous polymerization medium which is kept in constant contact with said coated surfaces throughout the polymerization reaction.

DETAILED DESCRIPTION

In accordance with the present invention, a film or coating of a polyaromatic amine and an aqueous media dispersant is applied to the interior surfaces of a polymerization reactor or vessel by merely contacting said surfaces with an aqueous alkali metal hydroxide solution of said polyaromatic amine and dispersant. Likewise, all exposed surfaces in the interior of the reactor, besides the interior walls, such as the baffles, agitator, and the like, are also treated in like manner. After the aqueous alkali metal hydroxide solution has been applied to the surfaces, the polymerization medium can be introduced to the reactor and the reaction started without the necessity of drying said surfaces prior to the introduction of the polymerization medium. Although it is not necessary, the coated interior surfaces of the reactor can be washed with water prior to introduction of the polymerization medium in order to remove excess coating solution therefrom. This can be accomplished by spraying the surfaces with water, or filling the reactor with water and draining. Surprisingly, there is thereby left, in either case, a tightly adhering coating or film on said surfaces which is not affected by the polymerization medium, even when agitated, in the sense of preventing the coating from achieving its assigned function, namely, the prevention of polymer buildup on said surfaces.

The polyaromatic amines useful in the practice of the present invention are made by means of a condensation reaction of two or more of the compounds listed below or by the self-condensation reaction of any of the compounds listed below containing at least one —OH group and at least one —NH$_2$ group. Generally, such reactions are carried out with heat in the presence of an acidic catalyst. The polyaromatic amines thus formed have the following general structures:

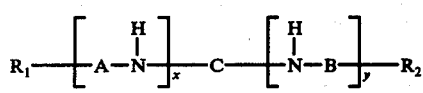

(I)

wherein A, B and C are either

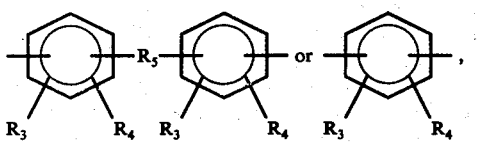

wherein R$_3$ and R$_4$ are the same as defined below, and R$_5$ is

or a straight chain or branched alkylene or alkylidene group containing from 1 to 5 carbon atoms, and wherein A, B and C may be the same or different and each repeating unit may be the same or different; R$_1$ and R$_2$ are either —H, —OH, —NH$_2$ or

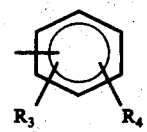

and may be the same or different; R$_3$ is —H, halogen, or an alkyl group containing from 1 to 8 carbon atoms and may be the same or different; R$_4$ is —H, —OH, —NH$_2$, or an alkyl group containing from 1 to 8 carbon atoms and may be the same or different; x is an integer from 1 to 20; and y is an integer from 0 to 20. When a trifunctional compound is employed, such as the trihydroxy benzenes, for example, then branched chains will result thus producing a branched polyaromatic amine; and

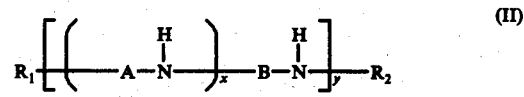

(II)

wherein A and B are either

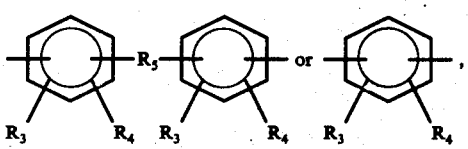

wherein R$_3$, R$_4$ and R$_5$ are the same as in formula (A), and wherein A and B may be the same or different and each repeating unit may be the same or different; R$_1$ is —H, —OH, —NH$_2$ or

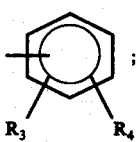

R$_2$ is —H, or

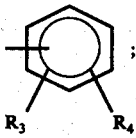

x is an integer from 1 to 4; and y is an integer from 1 to 15.

The compounds generally useful in making the polyaromatic amines employed in the present invention are (a) the polyamino benzenes having the formula:

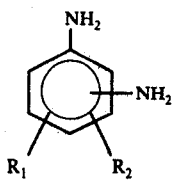

wherein $R_1$ is —H, —NH$_2$, —OH or an alkyl group containing from 1 to 8 carbon atoms, and $R_2$ is —H, halogen, or an alkyl group as defined for $R_1$, such as, for example, ortho, meta and paraphenylene diamines; diamino toluenes, diamino xylenes, diamino phenols, triamino benzenes, toluenes and xylenes; ethyl, propyl, butyl and pentyl di- and tri-amino benzenes; and the like; the most preferred compounds being those in which $R_1$ is —H and $R_2$ is —H, methyl, or ethyl; (b) the polyhydric phenols having the formula

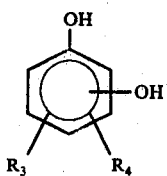

wherein $R_3$ is —H, —NH$_2$, —OH, or an alkyl group containing from 1 to 8 carbon atoms, and $R_4$ is —H, —OH, halogen, or an alkyl group as defined for $R_3$, such as, for example, catechol, resorcinol, chloro-resorcinol, hydroquinone, phloroglucinol, pyrogallol, etc.; dihydroxy toluenes and xylenes; trihydroxy toluenes and xylenes; ethyl, propyl, butyl and pentyl di- and tri-hydroxy benzenes; and the like, the most preferred compounds being those in which $R_3$ is —H and $R_4$ is —H or —OH; (c) the aminophenols and alkyl-substituted aminophenols having the formula

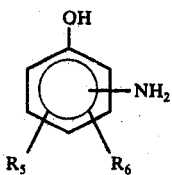

wherein $R_5$ is —H, —NH$_2$, —OH or an alkyl group containing from 1 to 8 carbon atoms, and $R_6$ is —H, —NH$_2$, halogen or an alkyl group as defined for $R_5$, such as, for example, ortho, meta, and para-aminophenols; diamino- and triaminophenols; methyl, ethyl, propyl, butyl and pentyl amino and diaminophenols; and the like, the most preferred compounds being those in which $R_5$ is —H and $R_6$ is —H or —NH$_2$; and (d) diphenylamines, alkyl-substituted diphenylamines and other compounds having the formula

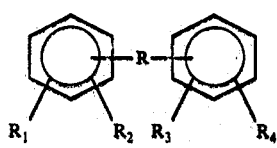

wherein R is

or a straight chain or branched alkyl group containing from 1 to 5 carbon atoms, and $R_1$, $R_2$, $R_3$ and $R_4$ may each be —H, —NH$_2$, —OH, halogen or an alkyl group containing from 1 to 8 carbon atoms and at least two are —NH$_2$, —OH or one of each, such as, for example, bis-phenol A, and the like, the most preferred compounds being those in which $R_1$ and $R_4$ are —OH or —NH$_2$ and $R_2$ and $R_3$ are —H.

The halogen in the above formulas may be chlorine, bromine, iodine, or fluorine.

The molecular weight or degree of condensation of the polyaromatic amine depends upon the ratio in which the reactants are combined, the time and temperature of heating, and the kind and concentration of the catalyst. When reacting two or more of any of the above compounds together, they are usually employed in equal molar proportions. However, in order for the resultant condensation polymer or product to be soluble in aqueous alkali metal hydroxide solutions, there must be a sufficiency of hydroxyl groups present on the aromatic nucleii. In view of this, it is preferable to employ the starting materials in such amounts and use reaction conditions such that a polyaromatic amine condensation product is obtained which has a maximum number of molecules terminated at both ends by hydroxyl groups. On the other hand, referring to the above formulas, if $R_1$ and $R_2$ are —NH$_2$ groups, then sufficient of the $R_3$ and $R_4$ groups must be hydroxyl in order to achieve the necessary solubility. It has been found that about 2 or more hydroxyl groups per 1000 molecular weight are required for the above-mentioned solubility. It is the acidity of such hydroxyl groups that enhances the solubility of the polyaromatic amines in aqueous alkali metal hydroxide solutions, such as sodium hydroxide, for example.

It is also possible to regulate the molecular weight of the polyaromatic amines by the use of small amounts of monofunctional compounds. For example, one can use small amounts of an aromatic monoamine or a phenol to cap the polymerization and thereby control the molecular weight. Those polyaromatic amines having a molecular weight greater than about 250 are satisfactory. The upper limit of molecular weight will vary depending upon the particular compound or compounds employed in making the polyaromatic amine. Suffice it to say that the particular polyaromatic amine should have a molecular weight such that it is workable and soluble in an aqueous alkali metal hydroxide solution so that it can be readily applied to the inner surfaces of the reactor when in a coating solution containing appropriate amounts of dispersant, as described hereinafter. I have found that for purposes of the instant invention, polyaromatic amines having a molecular weight in the range of about 250 to about 1000 are preferred.

Particularly useful polyaromatic amines for the present invention are those obtained when an aromatic diamine and a polyhydric phenol are reacted together in approximately equal molar ratio. However, it is possible to use an excess of either the diamine or the phenol. The only difference is that when an excess of the polyhydric phenol is employed, polyaromatic amines are obtained which have a somewhat higher softening point than those made in the presence of an excess of the aromatic diamine. While some of the polyaromatic amines useful in the practice of the present invention do not have a definite softening point, it has been found that among the solid polyaromatic amines, those having a softening point in the range of about 65° to about 150° C. are most satisfactory. The softening point of the polyaromatic amine is determined by a procedure which is adequately described in copending application Ser. No. 574,037, filed May 2, 1975, in the names of Donald E. Witenhafer, James B. Haehn and Louis Cohen.

When making the polyaromatic amines an acid catalyst is employed. HCl is the most effective catalyst. However, other useful catalysts may be employed, such as, for example, methane sulfonic acid, benzene sulfonic acid, sulfanilic acid, phosphoric acid, iodine, benzene disulfonic acid, hydrogen bromide (HBr), hydrogen iodide (HI), aluminum chloride, and the like. The concentration of catalyst will vary but it has been found that a catalyst concentration of from about 0.005 to about 0.20 mole per mole of the compound being self-condensed, or per mole of the amino compound when one or more compounds are being reacted, is satisfactory. At any rate, the amount of catalyst employed is not critical.

The temperature of the reaction of the compounds, either alone or with others, will vary depending upon the time of the reaction and the molecular weight desired in the final product. For example, one can heat the reaction ingredients rapidly to 315° C. and then hold at that temperature for various periods of time. Also, the reaction ingredients can be heated to various temperatures above 300° C. and immediately cooled. When this latter procedure is employed, the reaction time is defined as 0 hours. Accordingly, the temperature of the reaction will vary from about 150° to about 360° C. and the time of reaction will vary from about 0 hour to about 3 hours. The preferred range of reaction temperature is from 175° to 330° C. and the time of reaction from 0 hour to 1 hour. It is understood, of course, that the particular time and temperature selected is dependent upon the catalyst employed and the final molecular weight of the polyaromatic amine desired.

The important part of the instant invention, and the significant improvement in the use of polyaromatic amine reactor coating compositions, is the combination of an aqueous media dispersant or suspending agent, with the polyaromatic amine in the coating composition. The aqueous media dispersants or suspending agents useful in the present invention are polyvinyl alcohol, polyvinyl pyrrolidone, gelatin (Calf skin), starch, and hydroxy propyl methyl cellulose (Methocel). The amount of dispersant or suspending agent employed in the coating composition or solution is set out hereinafter.

The most preferred dispersants or suspending agents are the polyvinyl alcohols (hereinafter "PVA") which are produced by hydrolyzing polyvinyl acetate to an amount in the range of about 75 to about 100%. Since most of the commercial PVA's are hydrolyzed polyvinyl acetates of about 88%, it is preferred, for practical reasons, to employ a PVA which is in the range of about 85 to about 90% hydrolyzed polyvinyl acetate. It should be noted that when employing a PVA which contains about 25% vinyl acetate groups (hydrolysis = 75%) in water, turbidity occurs indicating incomplete solution, particularly upon heating. However, when the same PVA is employed in the aqueous alkali metal hydroxide coating solution of the present invention, such turbidity disappears since further hydrolysis occurs at the high pH of the hydroxide coating solution. The most preferred PVA is one which is an 88% hydrolyzed polyvinyl acetate.

As has been previously pointed out, an alkali metal hydroxide solution of a polyaromatic amine, as defined above, when applied to the interior surfaces of a polymerization reactor, will reduce the buildup of polymer thereon. However, the polyaromatic amines are colored materials and solutions thereof will discolor the polymer particles that do form on the inner surfaces of the reactor. If these polymer particles are inadvertently removed from said surfaces, during the course of making the polymerization product, such as polyvinyl chloride (PVC), the entire batch of polymer can be rejected for inferior quality due to the occurrence of said off-white particles of polymer. The discoloration problem is primarily due to the necessarily high concentrations of polyaromatic amines that must be employed in order to get the proper amount thereof adsorbed on the interior surfaces of the reactor. It should be pointed out, however, that the polyaromatic amines do substantially eliminate buildup on said surfaces when the concentration thereof is sufficiently high in the coating composition.

The reason for the necessity to use such a large amount of polyaromatic amine is that you need a water-wettable surface in order to prevent buildup. An ordinary solid surface, such as stainless steel for example, is not water-wettable due to the normal contamination of said surface with organic materials through contact with the atmosphere. The surface can be cleaned, such as with chromic acid, for example, and it will become water-wettable. However, this is not the full answer, since the surface will not remain in that condition for a sufficient length of time, that is, for more than the duration of a single polymerization reaction. That is to say, the surface must be recleaned after each polymerization cycle. Therefore, applying a coating to the surface which will be water-wettable and resist polymer buildup thereon and remain on said surface throughout multiple reaction cycles is more desirable.

When a metal or solid surface is non-wettable, a liquid, such as water, thereon will form droplets and not flow out into a smooth uniform film. The angle formed between the tangent of the side of the droplet and the metal or glass surface is called the "contact angle" and is referred to as "theta" ($\theta$). A further measurement of the wettability of a solid surface is the critical surface tension for wetting a solid surface and is expressed as "$\gamma_c$". The $\gamma_c$ is measured in dynes per centimeter. Using water as the standard, in order for a solid surface to be wettable, $\theta$ must equal zero or be very close to it, and $\gamma_c$ must be 72 dynes/cm. or greater.

More importantly, the material being applied to the surface should not only form a wettable surface, but also form a layer or film thereon which is not readily removable. This film adheres to the solid or metal surface by adsorption and in many cases, the film is a monolayer of the material applied which is of the order of a molecule in thickness. The films of the coating compositions of the instant invention have a thickness of about 20A or less indicating a film approximately one molecule in thickness. These films of such thickness are invisible to the naked eye thus solving the color problem heretofore referred to. The film or layer formed by the coating composition applied to the surface is not removable by washing with water. That is to say, the coating or film is resistant to removal from the surfaces when a turbulent aqueous reaction medium is in contact therewith, caused by the agitation of the polymerization mixture in the reactor.

The coating solutions of the instant invention are made by conventional methods, using heat and agitation where necessary. The polyaromatic amine and the dispersant or suspending agent are dissolved in the appropriate aqueous alkali metal hydroxide solution to an extent such that the solids content of the coating solution does not prevent it from being easily applied on the inner surfaces of the reactor. Usually a coating solution having a solids content of polyaromatic amine in the range of about 0.01 to about 0.10% by weight and of dispersant in the range of about 0.002 to about 0.02% by weight is satisfactory. The total solids content of the polyaromatic amine and dispersant of the coating solution will be in the range of about 0.012 to about 0.12% by weight. However, since the solids content depends upon the molecular weight of the ingredients in the coating solution, the total solids content could, in certain instances, be greater than 0.12% or less than 0.012% by weight. Irrespective of the total solids content chosen, within the limits defined above, it is important that the ratio of polyaromatic amine to dispersant be kept within certain prescribed limits. I have found that a ratio of polyaromatic amine to dispersant in the range between about 10 to 1 to about 2 to 1 is satisfactory. The preferred or optimum ratio is one in the range of 7:1 to 2:1. For example, I have found that a ratio of polyaromatic amine to polyvinyl alcohol of 5:1 comes close to the conceptual model wherein each polyaromatic anion present associates with each $+CH_2-CHOH+$ repeating unit of the polyvinyl alcohol, either by hydrogen bonding or hydrophobic bonding. In the coating solution a polyelectrolyte complex is believed to be formed between the polyaromatic amine and dispersant with the latter acting as a carrier for the polyaromatic amine to the reactor surfaces. When the dispersant is present as a part of the recipe in the polymerization medium, rather than in the coating solution, it cannot act as a carrier for the polyaromatic amine after the fact, since the amine is already on the wall and of necessity, in higher concentration due to the absence of the dispersant in the coating solution. Also, with such higher concentration of polyaromatic amine, a visible colored surface coating results, which, as previously pointed out, is to be avoided. It is only when employing the coating composition of the instant invention that the desired result is obtained, namely, the use of a more dilute solution of polyaromatic amine and elimination of the color problem.

The important aspect of the present invention is that the use of a dispersant or suspending agent in the coating solution allows the use of lower concentrations of polyaromatic amine resulting in a lightly colored coating solution. In fact, at preferred solids concentrations, the color of the coating solution is slightly amber-colored thus eliminating the off-white particle problem previously referred to. It has been found that by the use of dispersants in the coating solution, the necessary concentration of polyaromatic amine therein can be reduced by a factor in the range of between about 10 to about 100 with the aforesaid accompanying benefits of eliminating any possible problems of off-white particles being produced by colored particles of polyaromatic amine reactor surface coating and also, a considerable economic benefit by use of less polyaromatic amine. For example, when employing 0.02% polyaromatic amine and 0.004% polyvinyl alcohol in a coating solution versus 1.5% polyaromatic amine without polyvinyl alcohol, the concentration reduction factor is 75.

The aqueous alkali metal hydroxide solutions used in making the coating solutions of the instant invention are those made from a metal in Group 1A of the periodic system. For example, such hydroxides as sodium hydroxide, lithium hydroxide, potassium hydroxide, rubidium hydroxide, cesium hydroxide, and francium hydroxide. Aqueous solutions of other compounds may also be used. For example, aqueous solution of quaternary amines, such as the tetraalkyl ammonium hydroxides, and the like, or other alkali metal salts, such as phosphates, for example, trisodium phosphate, and the like. I have found that it is most important that the compound chosen must, in aqueous solution, have a sufficiently high basicity or pH, usually about 12 or higher. Preferably, sodium hydroxide is employed and in a pH range of 12 to 13.5 in the final coating solution. However, it is believed that some compounds having a pH lower than 12 would be operable in the present invention. It has been found, for example, that the most successful use of the coating solutions of the present invention occurs most efficiently in solutions having a pH of about 12.5.

The temperature of the aqueous alkali metal hydroxide solution when the polyaromatic amine and dispersant are dissolved therein is not critical. Usually a temperature in the range of about 0° to about 100° C. is satisfactory. The order of dissolution of the ingredients is not critical, but since the dispersant usually dissolves more slowly than the polyaromatic amine, it is put into solution first. Agitation during dissolution of the coating solution ingredients is desirable and in some instances necessary, particularly when the polyaromatic amine is of a high molecular weight. In order to obtain the desired results, the concentration of the alkali metal hydroxide in the aqueous coating solution should be between about 0.04% by weight and about 0.60% by weight. Preferably the concentration of alkali metal hydroxide is from 0.10 to 0.25% by weight.

As previously pointed out, the coating solution is usually applied to the inner reactor surfaces by spraying. However, it is also possible to apply the coating solution by flooding the reactor and then draining, painting or brushing on, but spraying is the most practical and economical method of application. After spraying the coating solution on the inner surfaces and draining the reactor, the polymerization reaction can be started immediately without further treatment of said surfaces. However, it has been found that excellent results are obtained when after applying the coating solution to the inner surfaces of the reactor, the coated surfaces are sprayed with water and the reactor drained prior to charging the reactor with the polymerization mixture or recipe. It should also be pointed out that the present coating works equally well on glass or metal surfaces, such as stainless steel, and the like.

While the exact adhesion mechanism of the coating to the surfaces of the reactor is not known for certain, it is believed to involve some type of electrical force or adsorption between the reactor surfaces and the polyaromatic amine-dispersant complex. At any rate, the coating composition of the present invention does substantially eliminate polymer buildup on the reactor surfaces and what little polymer buildup, if any, that may occur, is of the sandy type which is of such a nature that it is readily removable from the reactor surfaces without the necessity of manual scraping procedures. The polymer buildup to be avoided is what is referred to as "paper buildup" since this type of buildup is very difficult to remove and usually requires hand scraping or the use of a high pressure jet stream of water or other liquid. In either event, the reactor must be opened in order to clean the same, which, of course, allows the escape of unreacted vinyl chloride into the atmosphere.

In accordance with the present invention, multiple polymerizations may be run without opening the reactor between charges. In one experiment, more than 100 charges of vinyl chloride were polymerized to polyvinyl chloride using the suspension polymerization process, in a reactor having the coating of the instant invention on the inner surfaces thereof, and recoating said surfaces without opening the reactor between charges. This is accomplished by applying the coating through spray nozzles mounted on the reactor. The rinse water is likewise entered through said nozzles. When the reactor was opened at the completion of the experiment and the inner surfaces examined, it was found that they were clean with only small isolated spots of sandy buildup, with the reactor being classified as clean, or in factory parlance, would be classified as a "clean poly". Although several charges may be run without recoating the surfaces, it has been found to be expeditious, and preferred, to recoat the internal surfaces of the reactor after each charge to insure uniform and efficient production. As previously pointed out, with the spray nozzles permanently mounted at strategic points on the reactor, it is possible to reach all inner surfaces thereof. When it is decided to recoat the reactor, the reactor is drained, and the inner surfaces of the reactor are flushed with water. The coating solution is sprayed on the surfaces by means of the spray nozzles and the reactor is drained of the excess solution in such a way that the same can be sent to a recovery system, is desired. Then, optionally, the surfaces are sprayed with water and effluent is discarded, or recovered, if desired. Thereafter, the reactor is charged with the polymerization medium and ingredients in the usual manner and the polymerization reaction commenced. It is understood, of course, that one can recoat the reactor as often as desired without opening the same, even after every charge is polymerized.

After the application of the coating composition on the interior surfaces of the reaction vessel, and when elected, spraying thereof with water, the reaction to be carried out in the equipment may be commenced immediately, no particular modification of processing techniques being required due to the presence of the coating. Further, utilization of the internally coated reaction vessel of the present invention does not adversely affect the heat stability or other physical and chemical properties of the polymers produced therein.

While the present invention is specifically illustrated with regard to the suspension polymerization of vinyl chloride, it is to be understood that the apparatus and process may likewise be applied in the dispersion, emulsion, or suspension polymerization of any polymerizable ethylenically unsaturated monomer or monomers where undesirable polymer buildup occurs. Examples of such monomers are other vinyl halides and vinylidene halides, such as vinyl bromide, vinylidene chloride, etc.; vinylidene monomers having at least one terminal $CH_2=C<$ grouping, such as esters of acrylic acid, for example, methyl, acrylate, ethyl acrylate, butyl acrylate, octyl acrylate, cyanoethyl acrylate, and the like; vinyl acetate; esters of methacrylic acid such as methyl methacrylate, butyl methacrylate, and the like; styrene and styrene derivatives including $\alpha$-methyl styrene, vinyl toluene, chlorostyrene; vinyl naphthalene; diolefins including butadiene, isoprene, chloroprene, and the like; and mixtures of any of these types of monomers and other vinylidene monomers copolymerizable therewith; and other vinylidene monomers of the types known to those skilled in the art.

The present invention, however, is particularly applicable to the suspension polymerization of vinyl chloride, either alone or in admixture with one or more other vinylidene monomers having at least one terminal $CH_2=C<$ grouping, copolymerizable therewith in amounts as great as about 80% or more by weight, based on the weight of the monomer mixture, since polymer buildup in the reaction vessel is a particularly bad problem here.

In the present invention, the polymerization process is usually conducted at a temperature in the range of about 0° to about 100° C. depending upon the particular monomer or monomers being polymerized. However, it is preferred to employ temperatures in the range of about 40° to about 70° C., since, at these temperatures polymers having the most beneficial properties are produced. The time of the polymerization reaction will vary from about 2 to about 15 hours.

The polymerization process may be carried out at autogenous pressures although superatmospheric pressures of up to 10 atmospheres or more may be employed with some advantage with the more volatile monomers. Superatmospheric pressures may also be employed with those monomers having the requisite volatilities at reaction temperatures permitting reflux cooling of the reaction mixture.

Further, the polymerization process may be carried out utilizing a full reactor technique. That is, the reaction vessel is completely filled with the polymerization medium and kept that way throughout the reaction by constant addition thereto of water or additional makeup liquid containing the monomer or monomers in the same proportion as at start-up. Upon the addition of a certain predetermined amount of liquid, the polymerization reaction is terminated, usually by the addition thereto of a short-stopping agent. The necessity for the addition of liquid is due to the shrinkage in volume of the reaction medium produced by the conversion of the monomer or monomers to the polymeric state.

It is again emphasized that the ratio of polyaromatic amine (PAM) to dispersant in the coating solution is most important. By way of illustration, for example, where PVA is adsorbed preferentially nearly exclusively, a surface results showing a significant contact angle ($\theta$) with water and characterized by a $\gamma_c$ of about 55 d/cm. (dynes/centimeter). Where the polyaromatic amine is preferentially adsorbed, a surface results showing a contact angle with water of 0° and a $\gamma_c > 72$ d/cm. If too low a ratio of PAM/PVA is employed, there is competition between adsorption of free PVA and PAM-PVA complex which results in a $\gamma_c$ less than 72 d/cm. If too high a ratio is employed, both PAM and PAM-PVA complex adsorb giving a $\gamma_c > 72$ d/cm. However, since at low concentrations, the PAM adsorption is not as efficient as the complex, a greater total concentration of PAM in the coating solution is required.

I have found that the best single criterion for determining the proper PAM/dispersant ratio is the "minimum concentration of PAM required to adsorb to form an irreversible water-wettable layer having a $\gamma_c$ of >72 d/cm. in 5 seconds". This correlates well with good performance as a reactor coating to eliminate polymer buildup. Concentrations in the coating solution of PAM below this minimum concentration require a longer time for adsorption and if appreciably below this concentration, will not perform well as a buildup preventing coating. Concentrations appreciably above this minimum value, while adsorbing and working, cause increase in color of the coating solution and the resultant "off-white" problems above-referred to.

In order to illustrate the above, a series of coating solutions were made up, using polyvinyl alcohol and varying the PAM/PVA ratio in light of the parameters outlined above. The polyaromatic amine employed was made by the reaction of m-phenylenediamine (m-PDA) with resorcinol (Res.) in equimolar parts. HCl was used as the catalyst in the following recipe:

|  | Mole | Grams |
|---|---|---|
| m-PDA | 1.0 | 108 |
| Res. | 1.0 | 110 |
| HCl | 0.1 | 3.65 |

The m-PDA and Res. were premixed and charged to a threenecked round bottom flask. The HCl catalyst was added and heating started with the temperature taken from room temperature up to 315° C. as rapidly as possible. Melting of the charge occurred at about 60°-70° C. When most of the solid had melted, a stream of nitrogen gas was introduced into the melt by means of a dip tube which provided agitation of the mixture. The reaction mixture was held at 315° C. for a period of ½ hour. Thereafter the heat was removed and a stream of air was directed over the flask. When the temperature had dropped to 250° C., the batch was quenched by pouring into a mixture of ice and water with agitation. The polyaromatic amine was then filtered off and air-dried at room temperature. The softening point of the polyaromatic amine or resin was 111° C. This resin is designated as PAM-I for purposes of simplicity with respect to the specific examples, which follow hereinafter.

The polyaromatic amine thus produced and the polyvinyl alcohol were dissolved in aqueous NaOH in varying ratios, as indicated in the table that follows, and the resulting solutions were adjusted to a pH of about 12. The minimum concentration of the PAM in each case was then determined. The results are tabulated in the following table:

TABLE I

|  | Ratio PAM/PVA | $\gamma_c$ in d/cm Adsorbed Layer | Minimum Concentration of PAM to give $\gamma_c$ >72 d/cm in 5 seconds |
|---|---|---|---|
| 1. | (PAM only) | >72 | 0.35% |
| 2. | 10/1 | >72 | 0.14% |
| 3. | 8/1 | >72 | 0.09% |
| 4. | 6/1 | >72 | 0.04% |
| 5. | 5/1 | >72 | 0.02% |
| 6. | 3/1 | ~72 | 0.04% |
| 7. | 2/1 | ~55 | 0.02 to 0.20% (Does not give $\gamma_c$ >72) |
| 8. | (PVA only) | ~55 | — |

The above results show that the optimum ratio of PAM/PVA is 5:1. Further, the concentration of polyaromatic amine is greatly reduced when employing polyvinyl alcohol in conjunction therewith. When employing polyvinyl alcohol it is possible to use 1/30th less polyaromatic amine and achieve the desired results.

The same procedure as above was followed using other dispersants in place of PVA and the optimum ratio of polyaromatic amine/dispersant and the minimum concentration to give $\gamma_c$ >72 d/cm. in 5 seconds. The results were as follows:

TABLE II

| Dispersant | Optimum Ratio PAM/Dispersant | Minimum Concentration of PAM to give $\gamma_c$ >72 d/cm in 5 seconds |
|---|---|---|
| Hydroxy propyl methyl cellulose | 6/1 | 0.03% |
| Polyvinyl pyrrolidone | 2/1 | 0.075% |
| Gelatin | 2/1 | 0.04% |

It is noted that in each case the concentration of polyaromatic amine was greatly reduced.

The polyaromatic amines used in the present invention will oxidize on normal exposure to oxygen. This oxidation is not detrimental if the PAM is used within a short time after being made. However, oxidation of the PAM causes darkening in color of the same, with its attendant difficulties, as previously pointed out, and further, the adherence to the reactor surfaces is adversely affected by such oxidation. However, by employing a dispersant in the coating solution, adherence to the wall of the polyaromatic amine is enchanced in spite of any oxidation thereof that might occur. This is so because the dispersant acts as a carrier for the PAM and binds it to the surfaces, so to speak. This avoids the necessity of employing high concentrations of PAM and prolonged application times.

PAM solutions on oxidation show an increase in the minimum concentration to give $\gamma_c$ >72 d/cm in 5 seconds adsorption. For example, referring to Table I above, a fresh PAM solution shows such a minimum concentration of 0.35%. When this solution was aged 1 hour exposed to the atmosphere the adsorption time, because of oxidation, increased to greater than 120 seconds. After aging for 2 days the minimum concentration had increased to 0.80%. Hence, the mechanism of transport to the surface was significantly altered by the oxidation of the PAM. On the other hand, in the case of the PAM/PVA complex, even though the PAM oxidation occurs on aging the mechanism of transport to the surface is not affected by aging for 2 days since the PVA polymer chain acts as the carrier and is not noticeably affected by the oxidation. This was shown by the following experimental data given in Table III.

TABLE III

| Formulation | Age | 650 % Light Transmission | Time to a $\gamma_c$ 72 Layer |
|---|---|---|---|
| 1. 0.05% PAM 0.0067% PVA 0.033% NaOH | Fresh | 77.6% | 15 seconds |
| 2. Same | 2 days | 60.0% | <20 seconds |
| 3. Same | 13 days | 36.0% | >30 seconds |

From the above, it can readily be seen that the adsorption time of the PAM/PVA complex is far superior to PAM alone, that is, >30 seconds after 13 days versus >120 seconds after 1 hour.

Although oxidation of high pH solutions of polyaromatic amine/dispersant is orders of magnitude less critical than solutions of polyaromatic amine alone, in terms of adsorption effects, the very low concentrations of polyaromatic amine possible in the instant invention make the ratio of available oxygen to polyaromatic amine much greater for a given aging condition so that eventually aging effects will be noticeable, that is, in 13 days and above. For this reason, and to lessen the chance of color problems, even further than that produced by the ability to use very low concentrations of polyaromatic amine in the present coating solutions, it is often desirable to incorporate antioxidants in the coating solution. Such addition does not adversely affect the properties or performance of the coating solutions. I have found that when sodium ascorbate is incorporated in the coating solution, in amounts in the range of about 0.05 to about 0.10% by weight, such addition significantly retards both darkening of the solution and increase in adsorption time, when compared to controls containing no antioxidant, for periods up to 14 days. It was found that sodium dithionite and sodium "phenolic acid" were also of value as antioxidants in the coating solutions of the instant invention.

In order to rate the various coatings, as particularly set forth in the specific examples which follow hereinafter, we have devised a rating scale with respect to paper and sandy buildup. An uncoated reactor, referred to as the control, where normal amounts of both types of buildup occur, is given a rating of 1.5. Any rating below 1.0 is good or a definite improvement. In other words, 0.0 rating is perfect, and so on.

In order to further illustrate the present invention, the following specific examples are given. It is to be understood, however, that this is merely intended in an illustrative and not limitative sense. In the examples, all parts and percents are by weight unless otherwise indicated.

EXAMPLE I

In this example the polyaromatic amine was made by the reaction of m-phenylenediamine (m-PDA) with resorcinol (Res.) in equimolar parts, as described above, and the product designated PAM-I. The coating solution was made up as follows, with the ingredients being mixed with agitation in the order listed:

| 1. | Demineralized H$_2$O | 731.5 | parts |
|---|---|---|---|
| 2. | 50% NaOH | 3.0 | parts |
| 3. | 10% Na Ascorbate in H$_2$O | 3.0 | parts |
| 4. | 2% Polyvinyl alcohol (PVA) (88% hydrolyzed polyvinyl acetate) | 1.5 | parts |
| 5. | 15% PAM-I, 10% NaOH | 1.0 | part |

The resultant coating solution contained the following percentages:
1. 0.0200% PAM-I
2. 0.0040% PVA
3. 0.20% added NaOH
4. 0.05% Na Ascorbate The pH of the coating solution was 12.45 and the time of adsorption on the reactor surfaces was less than 5 seconds. The inner surfaces of the reactor were coated by spraying the coating solution thereon and then rinsed with water. The following recipe was then charged to the reactor in usual fashion:

| Vinyl chloride | 1000 grams |
|---|---|
| Water (demineralized) | 2055 grams |
| 88% hydrolyzed polyvinyl acetate | 0.5 gram |
| SBP$^{(1)}$ (catalyst) | 0.5 cc |

(1) di-secondary butyl peroxydicarbonate The reaction was carried out with a full reactor, that is, sufficient water was added to fill the reactor and at a temperature of 57° C. with agitation. The reaction was continued with addition of water as the mixture shrank because of the formation of polymer in order to keep the reactor full. The reaction was discontinued upon the addition of 400 grams of water. The contents of the reactor were then removed in usual fashion. The same procedure of coating and polymerization was repeated two more times making a total of three cycles or charges. Thereafter, the internal surfaces were examined and classified in accordance with the aforementioned procedure for rating said surfaces. The rating was as follows: paper buildup 0.0 and sandy buildup 0.1. It can readily be seen that the coated reactor was far superior to the control, or uncoated reactor, which had a rating of 1.5. It should also be pointed out that there were no changes in the properties of the polymers produced in the presence of the coating, particularly, no change in color of the polymer and no off-white particles were present.

EXAMPLE II

In this example, the same coating solution as in Example I was employed. Also, the same polymerization recipe and conditions were used as in Example I. However, in this experiment the inner surfaces of the reactor were coated by spraying the coating solution thereon but the coating was not rinsed with water. The recipe was added immediately after coating and draining the excess. When the polymerization was complete, the contents were removed and the inner surfaces coated as before. When the second cycle or charge was complete, the surfaces were examined and rated as in Example I. The rating was as follows: paper buildup 0.0 and sandy buildup 0.1. Again it can be seen that the coated reactor was far superior to the control. Further, this example shows that it is not necessary to rinse the coating with water after application to the inner surfaces and prior to polymerization. The properties of the polymer were unaltered and no off-white particles of polymer were observed.

EXAMPLE III

In this Example, the same polymerization recipe and conditions were used as in Example I. The coating solution was made up as follows, with the ingredients being mixed with agitation in the order listed:

| 1. | Demineralized H$_2$O | 78.3 | parts |
|---|---|---|---|
| 2. | 1% NaOH | 19.7 | parts |
| 3. | 0.05% Ascorbic acid | 0.1 | part |
| 4. | 0.5% hydroxypropyl methyl cellulose | 1.7 | parts |
| 5. | 15% P AM-I, 10% NaOH | 0.34 | part |

The resultant coating solution contained the following percentages:
1. 0.05% PAM-I
2. 0.008% Hydroxypropyl methyl cellulose
3. 0.23% Added NaOH 4. 0.05% Ascorbic acid The same procedure for coating the reactor was followed as in Example I. Three polymerization charges or cycles were run as in Example I. Thereafter, the internal surfaces were examined and classified in accordance with the aforementioned procedure for rating said surfaces. The rating was as follows: paper buildup 0.3 and sandy buildup 0.0. The coated reactor was far superior to the control or uncoated reactor, which had a rating of 1.5.

EXAMPLE IV

The same procedures, as outlined in Examples I and III, were followed in this Example using the following coating solution:

| | | | |
|---|---|---|---|
| 1. | Demineralized H$_2$O | 64.8 | parts |
| 2. | 1% NaOH | 14.7 | parts |
| 3. | 0.2% polyvinyl pyrrolidone (PVP) in H$_2$O | 20.0 | parts |
| 4. | 15% PAM-I, 10% NaOH | 0.53 | part |

The resultant coating solution contained the following percentages:
1. 0.08% PAM-I.
2. 0.04% PVP
3. 0.20% Added NaOH The same procedures were then followed as in Example III and the rating of the reactor after 3 charges was as follows: paper buildup 0.3 and sandy buildup 0.3. Again the reactor was far superior to the control or uncoated reactor.

Coating of the internal surfaces of the polymerization reactor, in accordance with the present invention, substantially reduces, and in many cases, practically eliminates polymer buildup on said surfaces during the polymerization reaction and thus results in increased production over a unit period of time. In those instances where a little polymer buildup does accumulate on the interior surfaces, it is not of the hard, rough, difficult-to-remove type and is easily removed without employing the difficult and tedious scraping methods that are presently necessary in the art. More importantly, the present invention enables one to operate a closed polymerization system, which, in the case of vinyl chloride polymerization, has the advantage of reducing drastically the parts per million of vinyl chloride in the atmosphere of the plant. Such reduction in vinyl chloride in the atmosphere meets the requirements recently promulgated by OSHA (Occupational Safety and Health Administration) and EPA (Environmental Protection Agency). Numerous other advantages of the present invention will be apparent to those skilled in the art.

While the present invention has been described in terms of its specific embodiments, certain modifications and equivalents will be apparent to those skilled in the art and are intended to be included within the scope of the present invention, which is to be limited only by the scope of the appended claims.

I claim:

1. A process for substantially eliminating the buildup of polymers on the internal surfaces of a polymerization reaction vessel which comprises applying to said surfaces a coating solution comprised of an aqueous alkali metal hydroxide solution containing from about 0.01 to about 0.10% by weight of a straight chain or branched polyaromatic amine having a molecular weight greater than about 250 and having at least 2 —OH groups per 1000 molecular weight and from about 0.002 to about 0.02% by weight of an aqueous media dispersant selected from the group consisting of polyvinyl alcohol, polyvinyl pyrrolidone, gelatin (calf skin), starch and hydroxy propyl methyl cellulose, the ratio of said polyaromatic amine to said dispersant being in the range of about 10:1 to about 2:1, said polyaromatic amine having the structure selected from the group consisting of

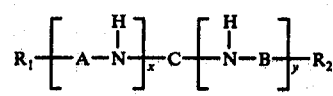

wherein (1) A, B, and C are selected from the group consisting of

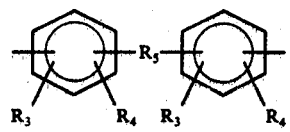

wherein R$_3$ is —H, halogen, or an alkyl group containing from 1 to 8 carbon atoms and may be the same or different; R$_4$ is —H, —OH, —NH$_2$ or an alkyl group containing from 1 to 8 carbon atoms and may be the same or different; and R$_5$ is

or a straight chain or branched alkylene or alkylidene group containing from 1 to 5 carbon atoms; and

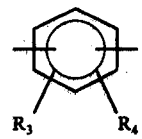

wherein R$_3$ and R$_3$ are the same as for (a); and wherein A, B, and C may be the same or different and each repeating unit may be the same or different; (2) R$_1$ and R$_2$ are either —H, —OH, —NH$_2$, or

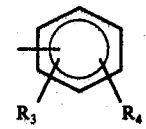

and may be the same or different and wherein R$_3$ and R$_4$ are the same as for (a); and (3) x is an integer from 1 to 20 and y is an integer from 0 to 20; and

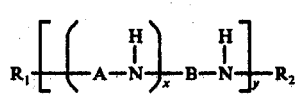

wherein (4) A, B, R$_1$, R$_3$, R$_4$ are same as in I and R$_2$ is —H, or

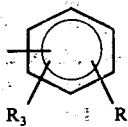

as defined in (2); and (5) x is an integer from 1 to 4 and y is an integer from 1 to 15.

2. A process as defined in claim 1 wherein the polyaromatic amine has the structure I.

3. A process as defined in claim 1 wherein the polyaromatic amine has the structure II.

4. A process as defined in claim 1 wherein the ratio of polyaromatic amine to polyvinyl alcohol is in the range of 7:1 to 4:1.

5. A process as defined in claim 1 wherein the pH of the coating solution is 12 or greater.

6. A process as defined in claim 1 wherein the total solids in said coating solution is from about 0.012% to about 0.12% by weight.

7. A process as defined in claim 1 wherein the polyaromatic amine is the reaction product of a polyamino benzene having the formula

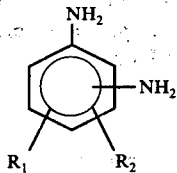

wherein $R_1$ is —H, —NH$_2$, —OH or an alkyl group containing from 1 to 8 carbon atoms; and $R_2$ is —H, halogen or an alkyl group as defined for $R_1$, and a polyhydric phenol having the formula

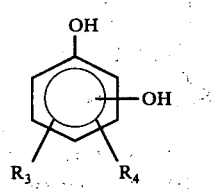

wherein $R_3$ is —H, —NH$_2$, —OH or an alkyl group containing from 1 to 8 carbon atoms; and $R_4$ is —H, halogen or an alkyl group as defined for $R_3$.

8. A process as defined in claim 1 wherein the polyaromatic amine is the reaction product of a polyamino benzene having the formula

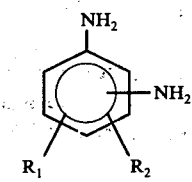

wherein $R_1$ is —H, —NH$_2$, —OH or an alkyl group containing from 1 to 8 carbon atoms; and $R_2$ is —H, halogen, or an alkyl group as defined for $R_1$, and a compound selected from the group consisting of diphenylamines, alkyl-substituted diphenylamines and other compounds all having the formula

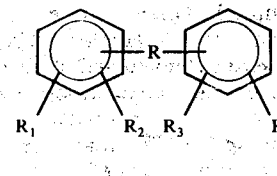

wherein R is

or a straight chain or branched alkylene or alkylidene group containing from 1 to 5 carbon atoms; and $R_1$, $R_2$, $R_3$ and $R_4$ may each be —H, —NH$_2$, —OH, halogen or an alkyl group containing from 1 to 8 carbon atoms and at least 1 of which is —OH.

9. A process as defined in claim 1 wherein the polyaromatic amine is the reaction product of a polyamino benzene having the formula

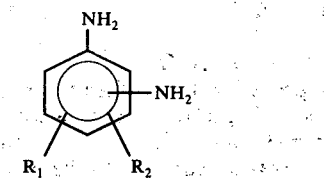

wherein $R_1$ is —H, —NH$_2$, —OH or an alkyl group containing from 1 to 8 carbon atoms; and $R_2$ is —H, halogen or an alkyl group as defined for $R_1$, and an aminophenol or an alkyl-substituted aminophenol having the formula

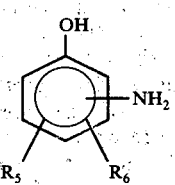

wherein $R_5$ is —H, —NH$_2$, —OH or an alkyl group containing from 1 to 8 carbon atoms; and $R_6$ is —H, —NH$_2$, halogen or an alkyl group as defined for $R_5$.

10. A process as defined in claim 1 wherein the polyaromatic amine is the reaction product of an aminophenol or an alkyl-substituted aminophenol having the formula

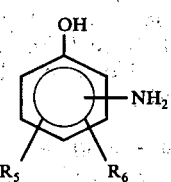

wherein $R_5$ is —H, —NH$_2$, —OH or an alkyl group containing from 1 to 8 carbon atoms; and $R_6$ is —H, —NH$_2$, halogen or an alkyl group as defined for $R_5$, and a compound selected from the group consisting of diphenylamines, alkyl-substituted diphenylamines and other compounds all having the formula

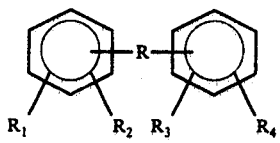

wherein R is

or a straight chain or branched alkylene or alkylidene group containing from 1 to 5 carbon atoms; and $R_1$, $R_2$, $R_3$ and $R_4$ may each be —H, —NH$_2$, —OH, halogen or an alkyl group containing from 1 to 8 carbon atoms and at least one of which is —OH or —NH$_2$.

11. A process as defined in claim 1 wherein the polyaromatic amine is the reaction product of a polyhydric phenol having the formula

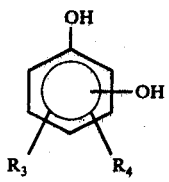

wherein $R_3$ is —H, —NH$_2$, —OH or an alkyl group containing from 1 to 8 carbon atoms; and $R_4$ is —H, halogen or an alkyl group as defined for $R_3$, and a compound selected from the group consisting of diphenylamines and alkyl-substituted diphenylamines and other compounds all having the formula

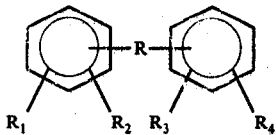

wherein R is

or a straight chain or branched alkylene or alkylidene group containing from 1 to 5 carbon atoms; and $R_1$, $R_2$, $R_3$ and $R_4$ may each be —H, —NH$_2$, —OH, halogen or an alkyl group containing from 1 to 8 carbon atoms and at least 1 of which is —NH$_2$.

12. A process as defined in claim 1 wherein the alkali metal hydroxide is sodium hydroxide.

13. A process as defined in claim 1 wherein the alkali metal hydroxide is potassium hydroxide.

14. A process as defined in claim 1 wherein the alkali metal hydroxide is lithium hydroxide.

15. A process as defined in claim 1 wherein the polyaromatic amine is the reaction product of m-phenylenediamine and resorcinol.

16. A process as defined in claim 1 wherein the polyaromatic amine has a molecular weight in the range of about 250 to about 1000.

17. A process as defined in claim 1 wherein the polyaromatic amine has a softening point in the range of about 65° to about 150° C.

18. A process as defined in claim 1 wherein the dispersant is polyvinyl alcohol.

19. A process as defined in claim 2 wherein the dispersant is an 88% hydrolyzed polyvinyl acetate, the alkali metal hydroxide is sodium hydroxide, the pH of the coating solution is 12 or greater and the ratio of polyaromatic amine to polyvinyl alcohol is in the range of 7:1 to 2:1.

20. A process as defined in claim 3 wherein the dispersant is an 88% hydrolyzed polyvinyl acetate, the alkali metal hydroxide is sodium hydroxide, the pH of the coating solution is 12 or greater and the ratio of polyaromatic amine to polyvinyl alcohol is in the range of 7:1 to 4:1.

21. A process as defined in claim 15 wherein the dispersant is polyvinyl alcohol.

22. A process as defined in claim 21 wherein the alkali metal hydroxide is sodium hydroxide.

23. A process as defined in claim 22 wherein the pH of the coating solution is 12 or greater.

24. A process as defined in claim 23 wherein the ratio of polyaromatic amine to polyvinyl alcohol is 5:1.

25. A process as defined in claim 4 wherein the alkali metal hydroxide is sodium hydroxide.

26. A process as defined in claim 1 wherein the coating solution contains from about 0.05% to about 0.10% by weight of an antioxidant selected from the group consisting of sodium ascorbate, sodium dithionite and sodium phenolic acid.

27. A process as defined in claim 26 wherein the polyaromatic amine is the reaction product of m-phenylenediamine and resorcinol.

28. A process as defined in claim 27 wherein the alkali metal hydroxide is sodium hydroxide.

29. A process as defined in claim 28 wherein the dispersant is polyvinyl alcohol.

30. A process as defined in claim 29 wherein the ratio of polyaromatic amine to polyvinyl alcohol is 5:1.

31. A process as defined in claim 30 wherein the pH of the coating solution is 12 or greater.

32. A process as defined in claim 1 wherein the dispersant is hydroxy propyl methyl cellulose.

33. A process as defined in claim 1 wherein the dispersant is polyvinyl pyrrolidone.

34. A process as defined in claim 1 wherein the dispersant is gelatin (calf skin).

35. A process as defined in claim 32 wherein the ratio of polyaromatic amine to hydroxypropyl methyl cellulose is 6:1.

36. A process as defined in claim 33 wherein the ratio of polyaromatic amine to polyvinyl pyrrolidone is 2:1.

37. A polymerization reaction vessel having on all the internal surfaces thereof a coating comprised of a straight chain or branched polyaromatic amine having a molecular weight greater than about 250 and having at least 2 —OH groups per 1000 molecular weight and an aqueous media dispersant selected from the group consisting of polyvinyl alcohol, polyvinyl pyrrolidone, gelatin (calf skin), starch and hydroxy propyl methyl cellulose, the ratio of said polyaromatic amine to dispersant being in the range of about 10:1 to about 2:1, said polyaromatic amine having the structure selected from the group consisting of

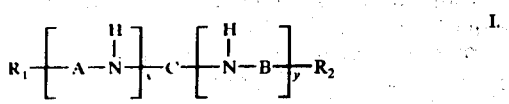

wherein (1) A, B, and C are selected from the group consisting of (a)

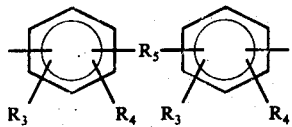

wherein $R_3$ is —H, halogen, or an alkyl group containing from 1 to 8 carbon atoms and may be the same or different; $R_4$ is —H, —OH, —NH$_2$ or an alkyl group containing from 1 to 8 carbon atoms and may be the same or different; and $R_5$ is

or a straight chain or branched alkylene or alkylidene group containing from 1 to 5 carbon atoms; and (b)

wherein $R_3$ and $R_4$ are the same as for (a); and wherein A, B, and C may be the same or different and each repeating unit may be the same or different; (2) $R_1$ and $R_2$ are either —H, —OH, —NH$_2$, or

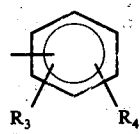

and may be the same or different and wherein $R_3$ and $R_4$ are the same as for (a); and (3) $x$ is an integer from 1 to 20 and $y$ is an integer from 0 to 20; and

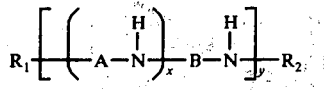

wherein (4) A, B, $R_1$, $R_3$, $R_4$ and $R_5$ are the same as in I and $R_2$ is —H, or

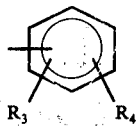

as defined in (2); and (5) $x$ is an integer from 1 to 4 and $y$ is an integer from 1 to 15.

38. A polymerization reaction vessel as defined in claim 37 wherein the polyaromatic amine has the structure I.

39. A polymerization reaction vessel as defined in claim 38 wherein the polyaromatic amine has the structure II.

40. A polymerization reaction vessel as defined in claim 37 wherein the polyaromatic amine is the reaction product of m-phenylenediamine and resorcinol.

41. A polymerization reaction vessel as defined in claim 37 wherein the coated surfaces are characterized by having a critical surface tension of at least 72 dynes/centimeter and a contact angle of about zero.

42. A polymerization reaction vessel as defined in claim 37 wherein the dispersant is polyvinyl alcohol.

43. A polymerization reaction vessel as defined in claim 41 wherein the polyaromatic amine is the reaction product of m-phenylenediamine and resorcinol.

44. A polymerization reaction vessel as defined in claim 43 wherein the dispersant is polyvinyl alcohol which is an 88% hydrolyzed polyvinyl acetate.

45. A polymerization reaction vessel as defined in claim 38 wherein the coated surfaces are characterized by having a critical surface tension of at least 72 dynes/centimeter and a contact angle of about zero.

46. A polymerization reaction vessel as defined in claim 39 wherein the coated surfaces are characterized by having a critical surface tension of at least 72 dynes/centimeter and a contact angle of about zero.

47. A polymerization reaction vessel as defined in claim 37 wherein the dispersant is hydroxy propyl methyl cellulose.

48. A polymerization reaction vessel as defined in claim 37 wherein the dispersant is polyvinyl pyrrolidone.

49. A polymerization reaction vessel as defined in claim 37 wherein the dispersant is gelatin (calf skin).

* * * * *